Oct. 30, 1945.  C. R. BURCH  2,388,118
LENS
Filed Sept. 14, 1943
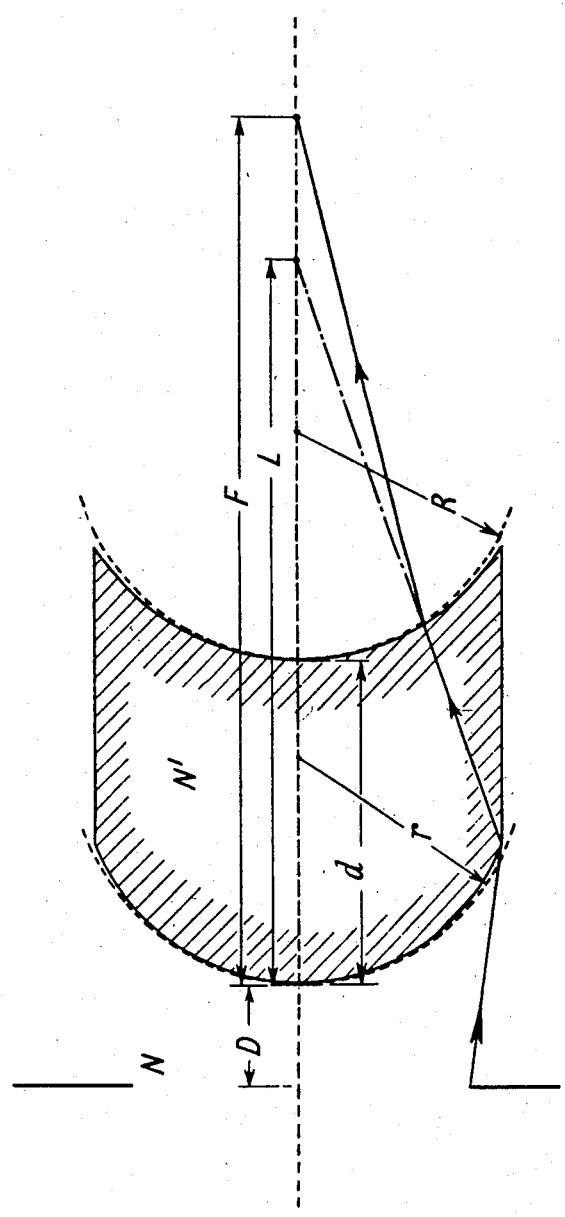
INVENTOR
Cecil Reginald Burch
By Norris & Bateman
ATTORNEYS Patented Oct. 30, 1945

2,388,118

UNITED STATES PATENT OFFICE 2,388,118

LENS

Cecil Reginald Burch, Nailsea, Bristol, England, assignor to Metropolitan-Vickers Electrical Company Limited, London, England, a company of Great Britain Application September 14, 1943, Serial No. 502,363
In Great Britain May 8, 1942

8 Claims. (Cl. 88—57)

This invention relates to the manufacture of lenses which are required to be anastigmatic or substantially so throughout the extended paraxial region. The paraxial region, as commonly understood, is that region within which the square of the angles, in radians, made by rays with the optical axis and/or the normals of the refracting surfaces is negligible as compared with unity. The extended paraxial region is defined as that region throughout which terms of higher order in the aforesaid angles than the fourth in the expression for aberrations of the wavefront may be neglected. The invention is concerned essentially with lenses composed of only one piece of glass, or equivalent material, that is singlet lenses, which lenses, as is well-known, cannot in general be achromatised both for image size and image position. It is herein contemplated that the lens is or can be achromatised for image size by adjustment of diaphragm position, that is to say, with the lens used to produce a real image of a distant object, although the lens is corrected so that the position of the focussing screen to give the sharpest image is not the same for light of different colours, say blue and red (in which circumstances the lens is said not to be achromatised for image position), yet, with the screen located midway the position giving the sharpest image for respective colours, say blue and red, the centres of the blue and red confusion patches by which a white object point is misrepresented are coincident.

Broadly speaking, the present invention has for an object to provide manufacturing data for well-corrected singlet anastigmats, or in other words, optical specifications to which singlet lenses shall be manufactured in order that they will be anastigmatic or substantially so throughout the extended paraxial region.

It is well-known that a lens consisting of one piece of glass bounded by two surfaces which are truly spherical can be made free from spherical aberration, coma and astigmatism for light of one colour if the radii of said spherical surfaces are specially chosen, and if the object and image surfaces have suitable radii of curvature, namely so that the intermediate image lies in what is called the Amici position with respect to both surfaces, this being generally the case as regards the front lens of an oil-immersed microscope; moreover, in the case of a lens for viewing an object surface located at infinity, it is well known to make the front face of the lens pseudo-planar (that is having an equation differing from that of a plane only by fourth power terms) and the back face spherical and concentric with the centre of the front face (this is the refractive analogue of the "Schmidt" camera); no claim to the construction of such lenses is herein made.

It is also well known that a lens may be corrected for simple spherical aberration and primary coma by aspherising one or more of its surfaces. Further, it can be shown that if a lens is aspherised so that the spherical aberration and coma errors are eliminated, in which case the lens is said to be aplanatic, the value of the astigmatism is independent of the position of the diaphragm.

The present invention concerns only singlet lenses in which anastigmatism is attained independently of diaphragm position and by the use of at least one aspheric surface; by "aspheric" is herein meant a surface the curve whereof has an equation which in cartesian co-ordinates, differs from that of a sphere by a term proportional to the fourth power of the zonal radius, terms of higher order being, for the purposes of this invention, ignored.

The accompanying drawing is a diagrammatic view of a lens made in accordance with the present invention.

In order to indicate in what manner anastigmatism of a singlet lens may be achieved according to the invention, let the singlet lens have a first surface of paraxial radius of curvature $r$, a second surface of paraxial radius of curvature $R$ (both $r$ and $R$ being positive if the convexities face the incident light), an axial thickness $d$ and a refractive index $N'$, and let the lens be immersed in a medium of refractive index $N$. Also let $$n = \frac{N'}{N}$$

that is the ratio of the refractive index of the material of the lens to that of the medium in which the lens is disposed (for air $N=1$ and then $n=N'$), it being necessary to specify the position of the object surface relatively to the lens, I shall do this conveniently by reference to the position of the intermediate paraxial image; let this image, real or virtual as the case may be, be formed at a distance L in the material of the lens down-light from the first surface. If U represents the distance of the object surface in front of the front surface of the lens, U and L are related by the known expression:

$$\frac{N'}{L}+\frac{N}{U}=\frac{N'-N}{r}$$

that is $$\frac{n}{L}+\frac{1}{U}=\frac{n-1}{r}$$

The significance of the symbols herein used, both as so far referred to, and as referred to subsequently in this specification, will be appreciated by reference to the accompanying drawing, which shows an axial section of a singlet lens, the front and back surfaces of which are shown as being aspheric and osculating the vertices of respective spherical surfaces indicated in broken line.

Now, for a singlet lens as thus defined, the departure from anastigmatism may be expressed as the sum of four quantities, namely a component due to the figuring on the front surface, a component due to the figuring on the back surface, and two components due to the absence of certain figurings, which, if introduced on hypothetical extra air-glass surfaces (virtual or real as the case may be) situated at the respective centres of curvature of the first $r$ surface and second $R$ surface of the lens, would anastigmatise individual refractions at these surfaces in the event of them being spherical. The retardations necessary on these hypothetical extra air-glass surfaces to produce anastigmatism without figuring of the surfaces of the lens itself would be as follows: for the first hypothetical surface, assumed to act on the light after refraction by the first $r$ surface of the lens, a retardation at zonal height $h$ of amount:

$$(n-1)\frac{h^4}{8r^3}n^2\left(\frac{L}{L-r}\right)^2\left[\frac{L-\left(\frac{n+1}{n}\right)r}{L}\right]$$

plus terms of higher order in $h$, and for the second hypothetical surface, supposed to act before refraction by the second $R$ surface of the lens, a retardation at zonal height $H$ of amount:

$$-(n-1)\frac{H^4}{8R^3}n^2\left(\frac{L-d}{R+d-L}\right)^2\left[\frac{L-d-\left(\frac{n+1}{n}\right)R}{L-d}\right]$$

plus terms of higher order in $H$. These retardations are the refracting analogues of the expression for the fourth power retardation necessary in the figured plate used in the Schmidt camera to anastigmatise a spherical reflecting surface, and are known to the prior art.

Applicant has found it to be mathematically legitimate, for the purpose of summating the four contributions to the departure from anastigmatism of the singlet as previously defined, to consider the two real and the two (missing) hypothetical figured surfaces, imaged into a representative space in which the object lies at infinity, by means of a hypothetical anastigmat with its anterior focus placed at the intermediate image (in the material of the lens). It can then be shown that this imaged system of four figurings (the missing hypothetical pair being taken negatively) will be anastigmatic (sixth power terms being neglected) and therefore that the actual singlet as above defined can be anastigmatic if, and only if, the fourth power strengths of the imaged figurings are inversely proportional each to the product of its algebraic distances from the other three. Expression of this inverse proportionality for the strengths of the imaged missing hypothetical figurings leads to the result that the defined singlet can be anastigmatic when, and only when, satisfying the condition:

$$\frac{L}{r}\left[\frac{L}{r}\left(\frac{n+1}{n}\right)\right](r-d)=\frac{L-d}{R}\left[\frac{L-d}{R}-\frac{n+1}{n}\right](R+d)$$

$$\frac{L}{r}\left[\frac{L}{r}-\left(\frac{N'+N}{N'}\right)\right](r-d)=$$
$$\frac{L-d}{R}\left[\frac{L-d}{R}-\left(\frac{N'+N}{N'}\right)\right](R+d)$$

which condition for convenience of description is elsewhere referred to as the condition or expression for anastigmatism of an aplanatic singlet, and the lens will in fact be anastigmatic (sixth power terms being neglected) if, in addition to the above condition for anastigmatism of an aplanatic singlet being satisfied, the figurings on its surfaces are so chosen (and this is always possible so long as $d$ is finite) that the singlet is in fact aplanatic, that is to say, that spherical aberration and primary coma for the lens are eliminated.

Thus, according to the present invention, a singlet lens is rendered anastigmatic in the extended paraxial region for an object surface which is located at a given distance, represented by the symbol U, in front of the front surface of the lens, by constructing the lens so that the values of $r$, $R$, $L$, $N$, $N'$ and $d$ for the lens, with these symbols having the significance hereinbefore set forth, are substantially such as mutually to satisfy the aforesaid expression for anastigmatism, of an aplanatic singlet and, in addition, by arranging that at least one, or if necessary each, of the front and back surfaces of the lens is aspherised, or figured, in such manner as to eliminate both simple spherical aberration and primary coma; in this connection it is to be understood that the elimination of spherical aberration and primary coma in a lens is always possible by aspherising, or figuring, both surfaces, provided the thickness of the lens is not negligible, and also that L is not equal to $d$ (the case $L=d$ is not likely to be met in practice, since for this case one of the figurings has to have infinite strength).

In practising the invention it will generally be convenient to assign particular values for the terms $r$, $R$, $N$ and $N'$ to derive the value of L from the known expression $$\frac{N'}{L}+\frac{N}{U}=\frac{N'-N}{r}$$

and then to ascertain the axial corresponding value of $d$, that is the thickness of the lens, for which the aforesaid expression for an astigmatism of an aplanatic singlet is satisfied.

It being usual for the focal length F in particular units of length to be specified, the optician proceeding in conventional manner will, after first obtaining numbers for $r$, $R$ and $d$ as described, then obtain the corresponding focal number F from the expression:

$$F=\frac{R.r}{\left(\frac{N'-N}{N}\right)\left[R-r+d\left(\frac{N'-N}{N'}\right)\right]}$$

The unit of length to be assigned to the numbers $r$, $R$ and $d$ is that for which the focal number $F$ has the desired value in the particular unit of length specified.

It is appreciated that to put unnecessarily fine tolerances on the thickness of the desired anastigmat may involve undue expense and that, allowing for slight tolerance in one or other of the finally selected values of $r$, $R$ and $d$, the lens, although not being truly an anastigmat in that its values of $r$, $R$ and $d$ are not such as mutually to satisfy exactly the aforesaid expression for anastigmatism of an aplanatic singlet, may nevertheless be well-corrected for astigmatism. Moreover, besides primary astigmatism there may exist several kinds of secondary astigmatism for rays lying outside the extended paraxial region and these higher order aberrations can, in part, be offset by a suitably chosen residual primary aberration; since the primary and secondary aberrations vary differently with respect to variations of aperture and field, they cannot cancel each other exactly, so that it may so happen that a lens, though not exactly anastigmatic for all orders of aperture and field, may exhibit such residual astigmatism as is negligible for practical purposes. It is in such respects that the principles of the invention may be applied in attaining substantial, though possibly not absolute, correction for astigmatism.

Accordingly, the invention also contemplates the construction of such lenses for which the values of one or more of the quantities $r$, $R$ and $d$ is/are made to differ but slightly from those selected values which mutually result in exactly satisfying the aforesaid expression for anastigmatism, of an aplanatic singlet, for example in the interests of economy or with a view to minimising the effect of higher order aberrations, and which lenses whilst not being exactly anastigmats are nevertheless substantially anastigmatic, or well-corrected for astigmatism, in the extended paraxial region. As a general criterion, it may be stated that a tolerance of the order of $\pm 10\%$ of the value of $d$, that is the thickness of the lens, as derived by substitution of particular values of $r$, $R$, $L$, $N$ and $N'$ in the aforesaid expression for anastigmatism of an aplanatic singlet, is permissive.

As regards the aspherising of the front and/or back surface(s) of the lens to attain correction for simple spherical aberration and primary coma, it may well be that, for any particular construction of lens, such surface or surfaces is/are of sufficiently inherent asphericity for the purpose in view without the necessity for any separate manufacturing step to produce asphericity. Where this is not the case, the required degree of asphericity will be produced in the usual manner by figuring, that is achieving the required shape by polishing.

The lens may be tested for asphericity to attain correction for spherical aberration and primary coma, by any of the available methods. One method, which forms no part of the present invention but may be generally convenient and satisfactory in use and which is herein briefly mentioned by way of example, is that which involves the use of a Twyman-Green interferometer, the asphericity of the emergent wave-front being shown by interference fringes which give contour lines of equal asphericity. In attaining the required correction by the use of such method of test, if the lens be skewed on the interferometer so that the lens is being tested off-axis, the fringe pattern seen may be resolved into a component of asphericity which is symmetrical about a "principal" ray passing through the pole of one face, say the front, of the lens, and an anti-symmetrical component. The anti-symmetrical component must be corrected by figuring the other surface, that is the back surface, since figuring a surface with revolution symmetry can only make a change symmetrical with respect to its own pole. When the anti-symmetrical component of the asphericity shown by the fringe pattern has been reduced to a value negligible compared with the symmetrical component, the first, or front, surface may then be figured to reduce the symmetrical component until the anti-symmetrical component is no longer negligible by comparison. The same procedure is then carried out for the second, or back, surface of the lens, the cycle of operations being iterated until the spherical aberration and primary coma errors are both negligible. It will be appreciated that correcting, by figuring the second surface, the component anti-symmetrical about the pole of the first will, in general, also alter the component symmetrical about the pole of the first surface, but correcting the symmetrical component, by figuring the first surface, will not alter the anti-symmetrical component. Thus, the iterative process is, in principle, convergent in case full correction is possible, and this is known to be so if secondary aberrations are neglected.

Where the lens is also required to have a substantially flat image field, for example for forming images on a flat surface, the lens must further satisfy the Petzval condition, namely that the values of $r$ and $R$ in the aforesaid mathematical expression for anastigmatism of an aplanatic singlet are interrelated by the equation $r=R$.

For a lens which is to be used in air $(N=1)$ and which is to be flat-fielded $(R=r)$ the condition for anastigmatism becomes:

$$\frac{L}{r}\left[\frac{L}{r}-\frac{N'+1}{N'}\right](r-d)=\frac{L-d}{r}\left[\frac{L-d}{r}-\frac{N'+1}{N'}\right](r+d)$$

wherein $N'$ is the refractive index for the material of the lens. Further, if the lens is to be used for imaging of distant objects, then $U=\infty$ and thus $$L=\frac{N'r}{N'-1}$$

In these circumstances, one solution of the above equation for anastigmatism is obtained when $r=d$, that is for a thick lens, and when $$\frac{L-d}{r}=\frac{N'+1}{N'}$$

that is for a lens in which the second surface is in the Amici position and only the second surface is aspherised, the resulting lens being anastigmatic if constructed of material such that the refractive index $N'$ has the value $$\tfrac{1}{2}(1+\sqrt{5})$$

that is, 1.618, and moreover the values of $L$ and $r$ in the aforesaid expression for anastigmatism are further inter-related by the equation:

$$L=\left(\frac{N'}{N'-N}\right)r$$

The chief merit of making the value of $N'=1.618$ for this case is that, only the back face of the lens need be figured.

Lenses according to the invention may be employed for example as photographic objectives with a colour filter restricting them more or less to light of one colour. Alternatively, they may be achromatised transversely, that is for image size by the use of a diaphragm so arranged that the circles of confusion due to colours not in focus are substantially concentric with the corresponding image points of the colour that is in focus on the plate. Where such diaphragm is used, its position, expressed as being at a distance D in front of the front pole of the surface of the lens (see accompanying diagram) in order to attain approximate transverse achromatism is given by the expression:

$$D = \frac{rd[(n-1)R - nr + (n-1)d]}{[nr-(n-1)d]^2 - R[n^2r - (n-1)^2 d]}$$

wherein $$n = \frac{N'}{N}$$

As an example of the manner in which the invention may be applied, let us consider the manufacture of a singlet lens which is required to be anastigmatic when taking parallel light on the front surface, that is for viewing an object surface at infinity, and which may have a convex front face of radius of curvature equal to one inch, and a concave back face of radius of curvature also equal to one inch. Further, the lens is to be used in air and is to be made of glass or other material such that the refractive index is 1.618. That is to say, adopting the foregoing conventions:

$$r=1, R=1, N=1, N'=1.618$$

$$U = \infty \text{ and thus } L = r \cdot \frac{1.618}{0.618}$$

Using the equation expressing the condition for anastigmatism of an aplanatic singlet, I find that there are two possible values for $d$, the thickness of the lens, which satisfy the equation namely when $d=1$ inch and $d=1.618$ inches. Thus the desired anastigmat may be a singlet lens constructed with a convex front surface and a concave back surface each of 1 inch and a thickness also of 1 inch, and which is figured in the back face sufficiently to remove spherical aberration and primary coma. The focal length of such lens as indicated by dimension F in the accompanying diagram will be of the order of 4.236 inches. Moreover, by the equation above set forth for the determination of D, we find that the lens will be achromatic for all practical purposes if used with a diaphragm the centre of which is located at a distance D of 0.309 inch in front of the pole of the front convex face of the lens.

Alternatively, the desired anastigmat may be a singlet lens which is constructed with a convex front surface and a concave back surface each of 1 inch, and a thickness of 1.618 inches and which moreover is corrected for spherical aberration and primary coma by figuring both the front and back surfaces, the front convex surface being figured so as to remove a fraction, namely 0.618 of the spherical aberration and primary coma whilst the back surface is figured to remove the remaining fractional part, that is 0.382. The focal length of such lens will be of the order of 2.618 inches. Further, it is found that the lens will be corrected for transverse chromatic aberration if used with a diaphragm the centre of which is located at the pole of the front surface of the lens.

It will be appreciated that the invention, as well as enabling the economic production of anastigmats of glass as commonly known, is eminently suited for the manufacture of such lenses from other materials such for example as moulded lenses composed of the so-called "plastic glass." Such anastigmats may be employed for various purposes, for example they may be used as photographic objectives, or as the so-called "night-sky" lenses used for spectrum work, possibly microscope substage condensers, the so-called "bulls-eye" lenses, and so forth.

I claim:

1. The method of making a singlet lens which is corrected for primary spherical aberration and coma and which is anastigmatic in the extended paraxial region for viewing an object surface at a given distance U in front of the front surface of the lens comprising forming transparent material into a single lens element having an axial thickness $d$ and substantially spherical front and back surfaces of radii of curvatures $r$ and $R$, respectively, in such proportion that $$\frac{L}{r}\left[\frac{L}{r} - \left(1 + \frac{N}{N'}\right)\right](r-d) = \frac{L-d}{R}\left[\frac{L-d}{R} - \left(1 + \frac{N}{N'}\right)\right](R+d)$$

where N' represents the index of refraction of said transparent material, N represents the index of refraction of the medium in which the lens is to be used, and L represents the distance of the intermediate paraxial image downlight from the front surface of the lens as determined by the relation $$\frac{N'}{L} + \frac{N}{U} = \frac{N'-N}{r}$$

and then aspherizing the lens element on at least one of said surfaces until the lens element is corrected for simple spherical aberration and primary coma, the resultant lens being also corrected for astigmatism.

2. A singlet lens which is corrected for coma and primary spherical aberration and which is anastigmatic in the extended paraxial region for viewing an object surface at a given distance U in front of the front surface of said lens consisting of a transparent lens element of appreciable axial thickness $d$ which has spheroidal front and back surfaces formed by aspherising front and back substantially spherical surfaces of radii $r$ and $R$, respectively, to correct the lens for coma and primary spherical aberration, said lens element being proportioned according to the relation $$\frac{L}{r}\left[\frac{L}{r} - \left(1 - \frac{N}{N'}\right)\right](r-d) = \frac{L-d}{R}\left[\frac{L-d}{R} - \left(1 + \frac{N}{N'}\right)\right](R+d)$$

where N' is the refractive index of said transparent lens element, N is the refractive index of the medium in which said lens is used and L represents the distance of the intermediate paraxial image downlight of the lens as determined by the relation $$\frac{N'}{L} + \frac{N}{U} = \frac{N'-N}{r}$$

3. The singlet lens defined in claim 2 wherein said axial thickness of the lens may vary within limits of ±10% of the determined dimension where $r$ and $R$ are assumed at finite values for a particular lens and $N$, $N'$ and $U$ are known.

4. A singlet lens as defined in claim 2, wherein $R$ is equal to $r$ whereby the lens is flat-fielded.

5. A singlet lens as defined in claim 2, wherein the object distance $U$ is so great as to be equivalent to infinity and the medium in which the lens is used is air, so that $$L = \frac{N'r}{N'-1}$$

6. In combination with the singlet lens defined in claim 2, means correcting said lens for transverse chromatic aberration when used in air comprising a coaxially apertured diaphragm located at a distance $D$ in front of the pole of the front surface of the lens, $D$ having the value $$\frac{rd(n-1)R - nr + (n-1)d}{[nr-(n-1)d]^2 - R[n^2r-(n-1)^2d]}$$

7. A singlet lens as defined in claim 2 having a focal length $F$ of the value $$F = \frac{R.r}{\left(\frac{N'-N}{N}\right)\left[R - r + d\left(\frac{N'-N}{N'}\right)\right]}$$

8. A flat-field singlet lens for use in air as defined in claim 2, wherein $N'$ equals approximately 1.618.

CECIL REGINALD BURCH.